(12) United States Patent
Sevdic et al.

(10) Patent No.: US 9,475,123 B2
(45) Date of Patent: Oct. 25, 2016

(54) CUTTING TOOL FOR RECESSING AND GROOVING

(75) Inventors: Nebojsa Sevdic, Plochingen (DE); Uwe Stemmer, Nürtingen (DE); Heinz Kressel, Ebenhofen (DE)

(73) Assignee: CeramTec GmbH, Plochingen (DE)

( * ) Notice: Subject to any disclaimer, the term of this patent is extended or adjusted under 35 U.S.C. 154(b) by 247 days.

(21) Appl. No.: 13/813,334

(22) PCT Filed: Aug. 3, 2011

(86) PCT No.: PCT/EP2011/063387
§ 371 (c)(1),
(2), (4) Date: Jan. 30, 2013

(87) PCT Pub. No.: WO2012/017018
PCT Pub. Date: Feb. 9, 2012

(65) Prior Publication Data
US 2013/0129437 A1    May 23, 2013

(30) Foreign Application Priority Data

Aug. 4, 2010   (DE) .......................... 10 2010 038 878

(51) Int. Cl.
| B23B 27/04 | (2006.01) |
| B23B 27/16 | (2006.01) |
| B23B 29/04 | (2006.01) |
| B23B 27/14 | (2006.01) |

(52) U.S. Cl.
CPC .......... *B23B 27/1625* (2013.01); *B23B 27/04* (2013.01); *B23B 27/145* (2013.01); *B23B 29/043* (2013.01); *B23B 2205/02* (2013.01); *Y10T 407/2272* (2015.01); *Y10T 407/27* (2015.01)

(58) Field of Classification Search
CPC . B23B 27/145; B23B 27/04; B23B 2205/02; B23B 27/1625
USPC .................. 407/109, 110, 50, 113, 102, 108
See application file for complete search history.

(56) References Cited

U.S. PATENT DOCUMENTS

|  195,699 | A | * | 10/1877 | Burger ............................ 83/843 |
|  867,275 | A | * | 10/1907 | Hunter ........................... 407/45 |
|  883,076 | A | * |  3/1908 | Askins ............................ 83/845 |
| 1,090,205 | A | * |  3/1914 | Gorton ........................... 407/45 |
| 1,707,903 | A | * |  4/1929 | Charlton ......................... 83/845 |
| 2,422,111 | A | * |  6/1947 | Lundberg ........................ 83/844 |
| 2,779,992 | A | * |  2/1957 | Hayes ........................... 407/107 |
| 2,846,756 | A | * |  8/1958 | Novkov ........................ 407/101 |

(Continued)

FOREIGN PATENT DOCUMENTS

| DE | 2 259 216 A1 |  9/1973 |
| DE | 3 909 358 C1 | 10/1989 |

(Continued)

*Primary Examiner* — Sunil K. Singh
*Assistant Examiner* — Sara Addisu
(74) *Attorney, Agent, or Firm* — Norton Rose Fulbright US LLP

(57) ABSTRACT

A cutting tool for radial and axial recessing and for lateral motion for so-called grooving of primarily metallic materials. The cutting tool has a clamping holder and a cutting element base, fastened to the clamping holder, on which a cutting element rests. The cutting element is pressed onto the cutting element base by a clamping finger of a clamping claw, and the cutting element being guided on the cutting element base with a prism.

5 Claims, 2 Drawing Sheets

(56) References Cited

U.S. PATENT DOCUMENTS

Figure 1:
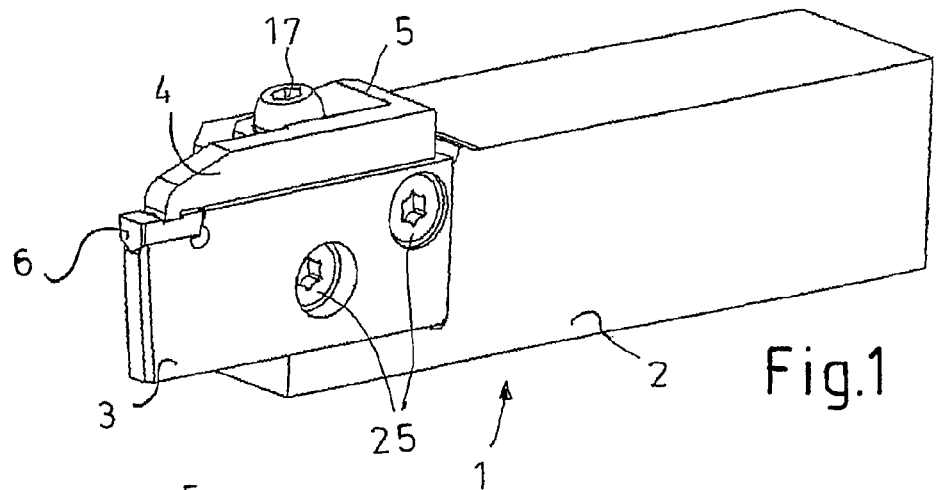

| Patent No. | | Date | Inventor(s) | Class |
|---|---|---|---|---|
| 3,543,363 A | * | 12/1970 | Diemond | 407/101 |
| 3,653,107 A | * | 4/1972 | Hertel | B23B 27/04 407/112 |
| 3,775,818 A | * | 12/1973 | Sirola | 407/73 |
| 3,780,408 A | | 12/1973 | McCreery | |
| 3,825,981 A | * | 7/1974 | Cochran et al. | 407/101 |
| 3,894,322 A | * | 7/1975 | Pano | 407/110 |
| 4,118,138 A | * | 10/1978 | Takacs et al. | 407/112 |
| 4,340,325 A | * | 7/1982 | Gowanlock | 407/116 |
| 4,417,833 A | * | 11/1983 | Wertheimer | 407/61 |
| 4,580,930 A | * | 4/1986 | Zinner | 407/110 |
| 4,604,004 A | * | 8/1986 | Armbrust | 407/110 |
| 4,738,570 A | * | 4/1988 | Wertheimer | 407/50 |
| 4,744,703 A | * | 5/1988 | Cochran | 407/45 |
| 4,801,224 A | * | 1/1989 | Pettersson et al. | 407/110 |
| 4,844,668 A | * | 7/1989 | Pettersson | 407/117 |
| 4,909,677 A | * | 3/1990 | Noguchi et al. | 407/66 |
| 4,969,779 A | * | 11/1990 | Barten | 407/114 |
| 4,992,007 A | * | 2/1991 | Satran | 407/110 |
| 5,085,541 A | * | 2/1992 | Simpson, III | 407/110 |
| 5,112,164 A | * | 5/1992 | Pano | 407/110 |
| 5,150,992 A | * | 9/1992 | Friedmann | 407/110 |
| 5,156,502 A | * | 10/1992 | Satran | 407/110 |
| 5,161,920 A | | 11/1992 | Zinner | |
| 5,315,908 A | * | 5/1994 | Mihic | 83/845 |
| 5,346,335 A | * | 9/1994 | Harpaz et al. | 407/11 |
| 5,375,948 A | * | 12/1994 | Lindstedt | 407/116 |
| 5,411,354 A | * | 5/1995 | Gustafsson | 407/110 |
| 5,439,327 A | * | 8/1995 | Wertheim | 407/11 |
| 5,516,241 A | * | 5/1996 | Plutschuck et al. | 407/110 |
| 5,626,189 A | * | 5/1997 | Hutchinson | 166/55.6 |
| 5,676,495 A | * | 10/1997 | Katbi et al. | 407/116 |
| 5,704,737 A | * | 1/1998 | Alford | 407/114 |
| 5,709,508 A | * | 1/1998 | Barazani et al. | 407/101 |
| 5,743,680 A | * | 4/1998 | Von Haas et al. | 407/19 |
| 5,799,554 A | * | 9/1998 | Friedman et al. | 82/160 |
| 5,829,924 A | * | 11/1998 | Oshnock et al. | 407/110 |
| 5,921,724 A | * | 7/1999 | Erickson et al. | 407/117 |
| 5,947,648 A | * | 9/1999 | Friedman et al. | 407/5 |
| 5,975,812 A | * | 11/1999 | Friedman | 407/114 |
| 5,993,118 A | * | 11/1999 | Brask et al. | 407/110 |
| 6,086,291 A | * | 7/2000 | Hansson et al. | 407/110 |
| 6,186,704 B1 | | 2/2001 | Hale | |
| 6,234,727 B1 | * | 5/2001 | Barazani | 407/117 |
| 6,249,950 B1 | * | 6/2001 | Brask et al. | 29/434 |
| 6,261,032 B1 | * | 7/2001 | Duwe et al. | 407/110 |
| 6,299,389 B1 | * | 10/2001 | Barazani | 407/110 |
| RE37,595 E | * | 3/2002 | Lindstedt | 407/116 |
| 6,428,247 B1 | * | 8/2002 | Friedman | 407/110 |
| 6,702,527 B2 | * | 3/2004 | Barazani | 407/42 |
| 6,702,529 B1 | * | 3/2004 | Tagtstrom et al. | 407/110 |
| 6,715,968 B1 | * | 4/2004 | Tagtstrom et al. | 407/116 |
| 6,974,283 B2 | * | 12/2005 | Oettle | 407/107 |
| 7,313,991 B2 | * | 1/2008 | Penkert | 82/1.11 |
| 7,320,564 B2 | * | 1/2008 | Gati | 407/114 |
| 7,384,218 B2 | * | 6/2008 | Nagaya et al. | 407/110 |
| 7,390,150 B2 | * | 6/2008 | Kocherovsky et al. | 407/40 |
| 7,524,147 B2 | * | 4/2009 | Hecht | 407/107 |
| 7,780,380 B2 | * | 8/2010 | Nagaya et al. | 407/101 |
| 8,079,785 B2 | * | 12/2011 | Nicholas | 407/101 |
| 8,104,999 B2 | * | 1/2012 | Hecht | 407/110 |
| RE43,718 E | * | 10/2012 | Friedman | 82/160 |
| 8,366,355 B2 | * | 2/2013 | Nagaya et al. | 407/113 |
| 8,388,270 B2 | * | 3/2013 | Waggle et al. | 407/49 |
| 8,388,271 B2 | * | 3/2013 | Elbaz et al. | 407/101 |
| 8,613,575 B2 | * | 12/2013 | Schaefer et al. | 407/107 |
| 8,647,023 B2 | * | 2/2014 | Volokh et al. | 407/41 |
| 8,647,028 B2 | * | 2/2014 | Athad | 407/110 |
| 8,647,029 B2 | * | 2/2014 | Hecht | 407/110 |
| 8,695,189 B2 | * | 4/2014 | Hecht | 29/267 |
| 8,701,537 B2 | * | 4/2014 | Baernthaler et al. | 83/843 |
| 8,827,598 B2 | * | 9/2014 | Henry et al. | 407/11 |
| 2008/0240875 A1 | * | 10/2008 | Nagaya et al. | 407/113 |
| 2009/0142149 A1 | | 6/2009 | Niemi et al. | |
| 2010/0158621 A1 | | 6/2010 | Zitzlaff et al. | |
| 2011/0182678 A1 | * | 7/2011 | Waggle | B23C 5/08 407/49 |

FOREIGN PATENT DOCUMENTS

| | | |
|---|---|---|
| DE | 8 214 831 U1 | 6/1991 |
| DE | 10 2008 001135 A1 | 10/2008 |
| WO | 00/51768 A1 | 9/2000 |

* cited by examiner

CUTTING TOOL FOR RECESSING AND GROOVING

This application is a §371 of International Application No. PCT/EP2011/063387 filed Aug. 3, 2011, and claims priority from German Patent Application No. 10 2010 038 878.5 filed Aug. 4, 2010, hereby incorporated by reference in its entirety.

The invention relates to a cutting tool for radial and axial recessing and for lateral motion for so-called grooving of primarily metallic materials, having a clamping holder and a cutting element base, fastened to the clamping holder, on which a cutting element rests, the cutting element being pressed onto the cutting element base by a clamping finger of a clamping claw, and the cutting element being guided on the cutting element base by means of a prism.

Such a cutting tool is disclosed in DE 10 2008 001135 A1.

The object of the invention is to improve a cutting tool together with its components according to the present invention in such a way that lateral turning operations may also be carried out without the cutting element being able to come unscrewed from its seat. In addition, the aim is to prevent the clamping claw from turning away laterally.

This object is achieved according to the invention in that on its flat surface facing the clamping finger the cutting element has two oppositely inclined flat rectangular roof slopes, in the manner of a saddle roof or gable roof of a house, which extend, starting at the surface, into the cutting element, and on its bottom side facing the cutting element the clamping finger has two ramps which are adapted to the slopes.

Since the cutting element on the one hand is guided on the cutting element base by means of a prism, and on the other hand has roof slopes on its surface in which corresponding ramps on the clamping finger engage, the cutting element is guided on its top and bottom sides, and may also carry out lateral turning operations without becoming unscrewed from its seat.

A ridge surface which forms part of the surface of the cutting element is preferably situated between the two roof slopes. This ridge surface is necessary to prevent formation of a sharp edge which could press into the clamping element or the clamping finger of the clamping claw. In the clamping element or in the clamping finger, a radius is present between the two roof slopes.

In one embodiment of the invention, the ridge surface forms a rectangle having a shorter side and a longer side. The shorter side of the rectangle is preferably equal to the width b of the ridge surface 9, and therefore is equal to the distance between the roof slopes 7, and the longer side of the rectangle is equal to the width B of the roof slopes. Optimal use is thus made of the available surface area.

In one preferred embodiment, the roof slopes extend at an angle of $15°>\alpha>5°$, preferably a $\alpha=10°$, with respect to the surface of the cutting element, the roof slopes extending, starting at the ridge surface, to the edge of the cutting element. Only at these angles is the cutting element on the one hand weakened only to a slight extent, and on the other hand easily anchored in the cutting tool. At larger angles, i.e., greater than 15°, the cutting element would be excessively weakened. At angles less than 5°, the anchoring in the cutting tool is not sufficient.

The cutting element base and the clamping claw are advantageously guided on the clamping holder with a precise fit by means of a tongue and groove connection, resulting in improved anchoring.

In one preferred embodiment, an inclined plane which is sloped to the rear, i.e., away from the cutting element, and designed as a groove is situated on the clamping holder, and the clamping claw, having a similarly inclined plane which is designed as a tongue, rests on this groove with a precise fit in the manner of a tongue and groove connection. As a result of this precise guiding, lateral turning away of the clamping element is avoided or is no longer possible.

To increase the clamping force of the clamping claw on the cutting element, bearing points designed as ribs are situated on the inclined plane of the clamping claw on the end facing away from the ramps, and the leadthrough for the clamping screw is situated on the opposite end of the inclined plane facing the ramps. A long lever arm thus acts when the clamping screw is screwed in, thereby increasing the clamping force.

A cutting element according to the invention is composed of a ceramic and/or CBN, having a flat top side and bottom side, and having side surfaces which connect the top and bottom sides. The cutting element is preferably usable on the above-described cutting tool.

According to the invention, on its top side the cutting element has two oppositely inclined flat rectangular roof slopes, in the manner of a saddle roof or gable roof of a house, which extend, starting at the surface, into the cutting element. These roof slopes allow twist-proof insertion into a cutting tool.

A ridge surface which forms part of the surface of the cutting element is preferably situated between the two roof slopes. This ridge surface is necessary to prevent formation of sharp edges.

In one preferred embodiment, the roof slopes extend at an angle of $15°>\alpha>5°$, preferably $\alpha=10°$, with respect to the surface of the cutting element, the roof slopes extending, starting at the ridge surface, to the edge of the cutting element. Only at these angles is the cutting element on the one hand weakened only to a slight extent, and on the other hand easily anchored in the cutting tool. At larger angles, i.e., greater than 15°, the cutting element would be excessively weakened. At angles less than 5°, the anchoring in the cutting tool is not sufficient.

In one preferred embodiment the cutting element has protruding engagement elements on its bottom side. The cutting element may thus be guided in a twist-free manner on its bottom side, and on its top side via the roof slopes. In one preferred design the engagement elements are spherical projections. The engagement elements are therefore advantageously part of a prism guide.

In one embodiment of the invention, the bearing surfaces of the top and bottom sides and/or the bevels of the cutting element have at least partial areas which are composed of the sinter skin which results during sintering, and which have experienced no damage from material-removing treatment. Refinishing after sintering is thus at least partially avoided.

In one preferred embodiment, the entire top and bottom sides are composed of the sinter skin which results during sintering. Since the sinter skin often has a greater hardness than the base material, the wear resistance of the cutting material is thus increased.

The greater the surface area of the cutting element that is composed of the sinter skin resulting during sintering, the greater the hardness. Therefore, preferably all bevels and/or sides are composed of the sinter skin which results during sintering.

Thus, in one embodiment of the invention, individual side surfaces or preferably all side surfaces are composed of the sinter skin which results during sintering.

The top and/or bottom side and/or the side surfaces and/or the bevels of the cutting element may be provided with a one or multilayer coating to improve the hardness.

A clamping claw according to the invention having a clamping finger, in particular for the above-described cutting tool, is characterized in that two oppositely inclined, flat rectangular ramps (8) are situated on the clamping finger (4) as the inverse of a saddle roof or gable roof of a house. The ramps are adapted to the roof slopes (7).

As mentioned above, the cutting element base and the clamping claw are preferably guided on the clamping holder with a precise fit by means of a tongue and groove connection. The cutting element base and the clamping claw are thus always in the required position.

In one embodiment of the invention, the clamping holder has a groove, and the cutting element base has a tongue on its side facing the clamping holder, the cutting element base being guided on the clamping holder with a precise fit by means of the tongue engaging in the groove.

Preferably, threaded holes are introduced into the groove and/or on the bearing surface of the cutting element base on the clamping holder, and the cutting element base has boreholes matched to the number of threaded holes, and screws which pass through the cutting element base are screwed into the threaded holes for fastening the cutting element base to the clamping holder. A simple, secure connection is established in this way.

The cutting element base is preferably oriented at right angles to the clamping claw.

A fastening hole which extends at an angle y with respect to the inclined plane is introduced into the inclined plane, designed as a groove, on the clamping holder, and a clamping screw which passes through the clamping claw engages with the fastening hole for fastening the clamping claw to the clamping holder.

Figure 2:
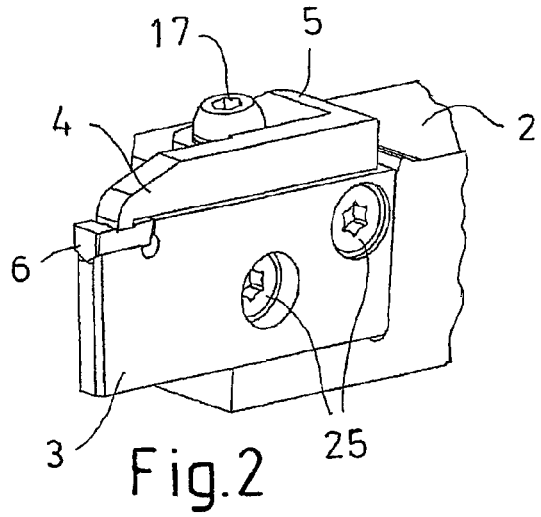
Figure 3:
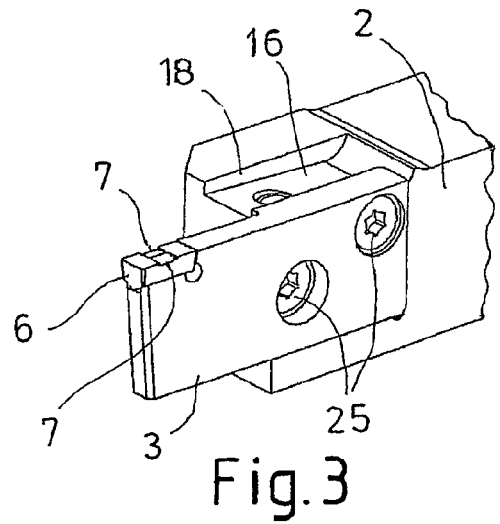
Figure 4:
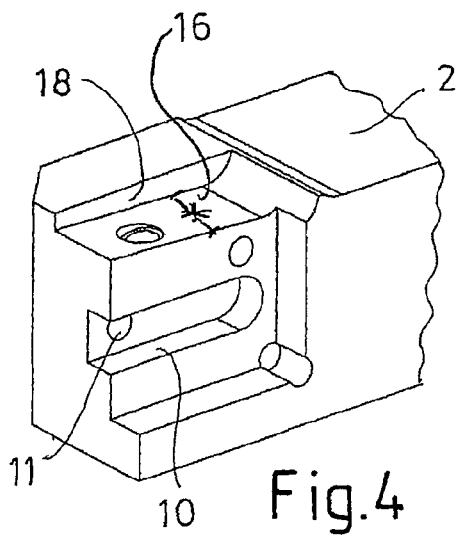
Figure 5:
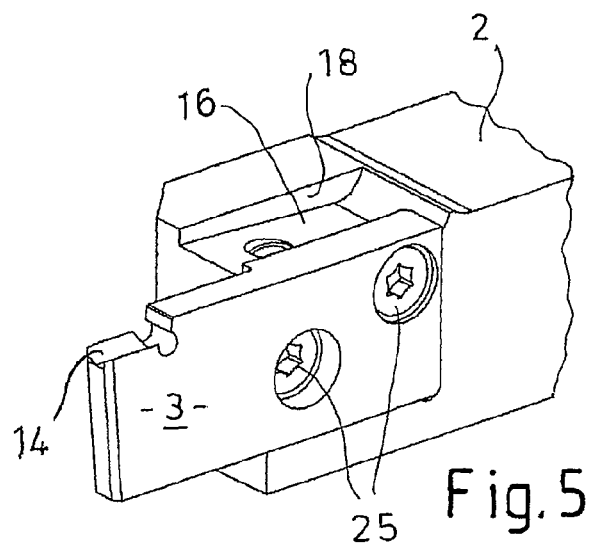
Figure 6:
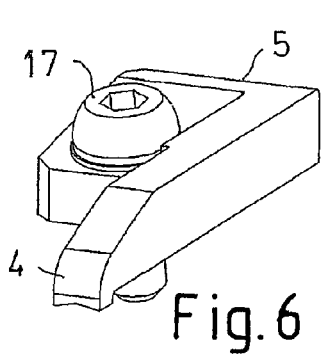
Figure 7:
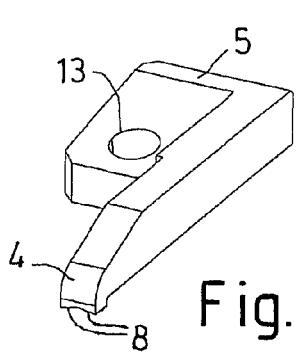
Figure 8:
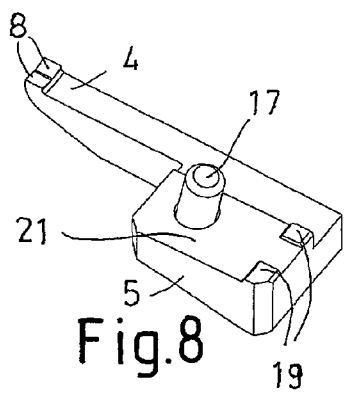
Figure 9:
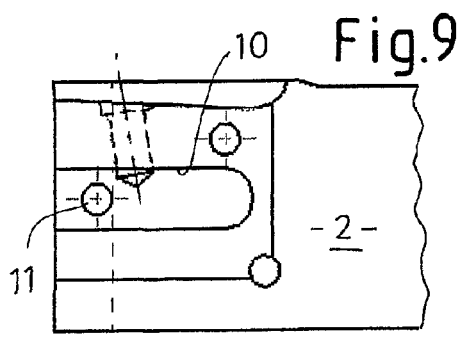
Figure 10:
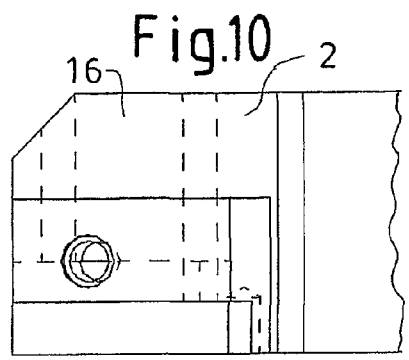
Figure 11A:
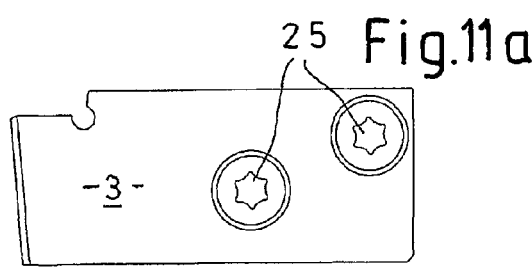
Figure 11B:
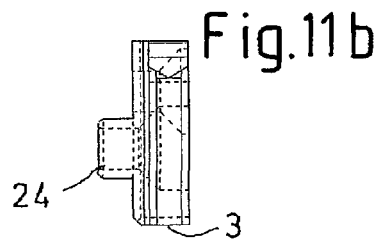
Figure 12A:
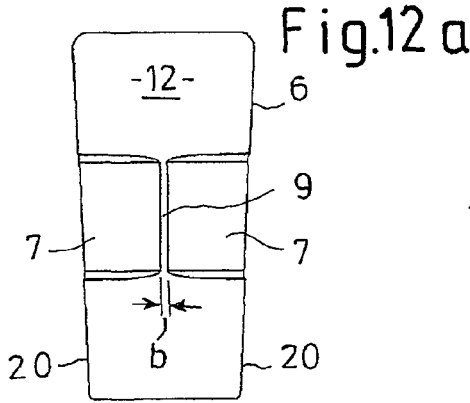
Figure 12B:
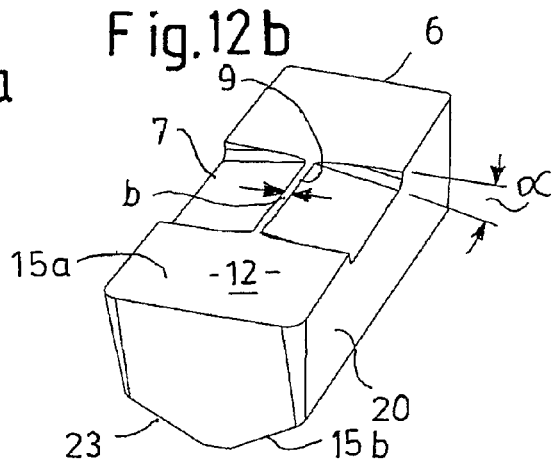

Further features of the invention are shown in the twelve figures described below:

FIG. 1: shows a cutting tool 1 according to the invention, having a clamping holder 2, cutting element base 3, clamping claw 5, and cutting element 6;

FIG. 2: shows the elements according to FIG. 1 in enlarged scale;

FIG. 3: shows the clamping holder 2 with the fastened cutting element base 3 and with the cutting element 6 placed thereon;

FIG. 4: shows only the clamping holder 2;

FIG. 5: shows only the clamping holder 2 with the fastened cutting element base 3;

FIG. 6: shows a clamping claw 5 according to the invention with the inserted clamping screw 17 in a [perspective] view;

FIG. 7: shows the clamping claw 5 without the inserted clamping screw;

FIG. 8: shows the clamping claw 5 from below;

FIG. 9: shows the clamping holder 2 according to FIG. 4 from the side;

FIG. 10: shows the clamping holder 2 from the top;

FIG. 11: shows the cutting element base 3 from the side (FIG. 11a) and in cross section (FIG. 11b); and FIG. 12: shows the cutting element 6 according to the invention from the top (FIG. 12a) and in a [perspective] view (FIG. 12b).

The clamping holder 2 described here is also referred to as a base holder, the cutting element base 3 is also referred to as a parting blade, and the clamping claw 5 is also referred to as a parting insert.

The invention relates to a cutting tool 1 (see the figures) which in its basic design may be used alike for recessing, thread cutting, and grooving. The cutting tool is always composed of a base support, referred to below as a clamping holder 2, an exchangeable cutting element base 3, and an exchangeable cutting element hold-down device, referred to below as a clamping claw 5. The cutting element base 3 and the clamping claw 5 form the so-called clamping system, and are adapted to the shape and function of the cutting element 6 used.

The clamping holder 2 (see FIGS. 1 through 5) has a guide groove 10 in the axial direction (see FIG. 4), in the base of which a threaded hole 11 is introduced. A tongue 24 protrudes into this guide groove 10 at the side of the cutting element base 3 facing the clamping holder 2. The tongue 24 is inserted into the guide groove 10 with a precise fit, so that the cutting element base 3 is precisely guided on the clamping holder 2.

For the positive-fit connection of the cutting element 6 on the cutting element base 3, the cutting element 6 is guided by a prism-shaped connection, also referred to as a guide strip, between the bottom side of the cutting element 6 and the top side of the cutting element base 3. Possible shape and position errors of the cooperating components are compensated for by the same axial orientation of the components and the mutually coordinated tolerances of the units, guides, and prisms in the technical sense of a clearance fit.

Furthermore, the cutting element 6 is also guided on its top side 15a. For this purpose, the cutting element 6 has two oppositely inclined, flat rectangular roof slopes 7 in the manner of a saddle roof or gable roof of a house which extend, starting at the surface 12, into the cutting element 6. These roof slopes 7 allow twist-free insertion into a cutting tool 1.

A ridge surface 9 which forms part of the surface 12 of the cutting element is situated between the two roof slopes 7. The four sides of the ridge surface 9 form a rectangle. The shorter side is preferably equal to the distance b between the ridge surfaces 9, and the longer side of the rectangle is preferably equal to the width B of the roof slopes (see FIG. 11a).

In the embodiment shown here, the roof slopes 7 extend at an angle $\alpha=10°$ (see FIG. 12b) with respect to the surface 12 of the cutting element 6, the roof slopes 7 extending, starting at the ridge surface 9, to the edge of the cutting element 6.

For anchoring the cutting element 6 to the cutting element base 3 with a precise fit, the cutting element 6 has protruding engagement elements 23 on its bottom side. The cutting element 6 is thus guided in a twist-free manner on its bottom side 15b, and on its top side 15a via the roof slopes 7. The engagement elements 23 are preferably spherical projections. The engagement elements 23 are part of a prism guide.

Another feature is the special design and bearing of the clamping claw 5, which is fastened to the top side of the clamping holder 2 by a clamping screw 17. The clamping claw 5 rests with its inclined plane 21 on an inclined plane 16 on the clamping holder 2, and is guided with a precise fit by the guide surface 18 (see FIGS. 3 through 8). The clamping force of the clamping screw 17 presses the clamping claw 5 onto the clamping holder 2 on the inclined plane 16 until the bearing points 19 of the clamping claw arrive at the inclined plane 16. Further tightening of the clamping screw 17 acts as a lever effect and clamps the clamping finger 4 of the clamping claw 5 in the direction of the cutting element 6, thus exerting an additional clamping force on the cutting element 6. As a result of this clamping force the cutting element 6 is pressed into the prism, and the guide strip 14 is pressed onto the cutting element base 3.

To reinforce this lever effect, the bearing points 19 and the leadthrough 13 for the clamping screw 17 are situated at the maximum possible distance from one another on the inclined plane 21.

The cutting element 6 is preferably made of a ceramic and/or PCBN or a CBN material.

The cutting element 6 may also be provided with a coating for increasing the hardness.

FIG. 8 shows bearing points 19 designed as ribs. FIG. 8 also shows that the bearing points 19 are situated on the sloped inclined plane 16 of the clamping claw.

The invention claimed is:

1. A cutting tool for radial and axial recessing and for lateral motion for grooving primarily metallic materials, comprising:
   a clamping holder;
   a cutting element base fastened to the clamping holder, on which a cutting element rests,
   wherein the cutting element is pressed onto the cutting element base by a clamping finger of a clamping claw;
   wherein a bottom side of the cutting element is guided on a top side of the cutting element base with a prism-shaped connection,
   wherein on a flat surface of the cutting element facing the clamping finger there are two oppositely inclined flat rectangular roof slopes which extend, starting from the flat surface, downward into the cutting element, and on its bottom side facing the cutting element the clamping finger has two ramps which abut said flat rectangular roof slopes, wherein a ridge surface which forms part of the flat surface of the cutting element is situated between the two roof slopes, wherein the ridge surface has four sides and forms a rectangle, and
   wherein a bottom surface of the clamping claw has a sloped inclined plane with bearing points designed as ribs which rests on a sloped inclined plane situated on a top surface of the clamping holder.

2. A cutting tool according to claim 1, wherein the rectangle has a shorter side and a longer side.

3. A cutting tool according to claim 2, wherein the shorter side of the rectangle is preferably equal to the width b of the ridge surface.

4. A cutting tool according to claim 1, wherein the roof slopes extend at an angle of $15°>\alpha>5°$ with respect to the surface of the cutting element, the roof slopes extending, starting at the ridge surface, to the edge of the cutting element.

5. A cutting tool according to claim 1, wherein the cutting element base is guided on the clamping holder with a precise fit by a tongue and groove connection.

* * * * *